Patented Feb. 26, 1929.

1,703,772

UNITED STATES PATENT OFFICE.

PAUL LÄUGER, OF BASEL, SWITZERLAND, ASSIGNOR TO THE FIRM OF J. R. GEIGY, S. A., OF BASEL, SWITZERLAND.

MANUFACTURE OF ALKYLISOROSINDULINE-SULPHONIC ACIDS.

No Drawing. Application filed December 16, 1927, Serial No. 240,647, and in Germany December 27, 1926.

When 1-chloro-3-alkylisorosindulines in the form of their hydrochlorides are treated by the process of U. S. patent specification No. 617,703 in aqueous solution with a sulphite, there are produced sparingly soluble 1-chloro-3-alkylisorosinduline-6-sulphonic acids which interact with amines or their sulphonic acids to form chloro-substituted phenonaphthosafranines.

This invention is based on the discovery that in alkylated 1-chloro-isorosindulines and their derivatives of the general formula

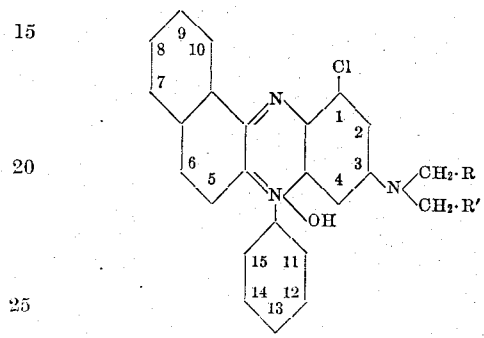

wherein R and R' represent hydrogen, alkyl or aryl, the chlorine atom in 1-position is exchanged in a surprising manner for the sulphonic acid group when the treatment occurs with sulphite, not in aqueous solution but in an organic solvent, such as a mono- or polyhydric alcohol. At the same time, however, there occurs an addition of a second sulphite molecule to this 1-sulphonic acid with entry of a second sulphonic group in the 6-position and reduction of the dyestuff to an easily soluble leucodisulphonic acid, which by action of atmospheric oxygen or other oxidizing agent passes into an isorosinduline-1:6-disulphonic acid. These isorosinduline-1:6-disulphonic acids have the general formula

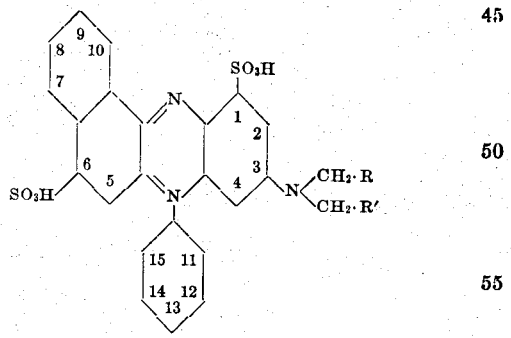

wherein R and R' represent hydrogen, alkyl or aryl. They are blue dyestuffs, which, indeed, dye wool in an acid bath blue, but are particularly valuable as intermediate products for making naphthosafranine dyestuffs.

The following example illustrates the invention:

45 parts by weight of 1-chloro-3-diethyl-isorosinduline hydrochloride (from phenyl-2-naphthylamine and nitroso-meta-chloro-diethylaniline hydrochloride) are caused to react in aqueous solution with 15 parts of crystallized sodium acetate; the product is separated completely by addition of a little salt, filtered and dissolved in 320 parts of boiling alcohol. After boiling for ¼ hour 180 parts of commercial sodium bisulphite solution are added and boiling is continued for 24–48 hours. The alcohol is distilled and the residue dissolved in 2000 parts of boiling water; the solution is filtered from a small quantity of insoluble matter and air is passed through it for about 5 hours. A part of the diethylisorosinduline-1:6-disulphonic acid separates and by addition of common salt the rest can be almost completely precipitated.

The dyestuff dissolves in water to a greenish blue solution. In concentrated sulphuric acid to a clear red-brown solution. It crystallizes in small green-bronze to red-bronze needles.

In this example there can be substituted for the 1-chloro-3-diethylisorosinduline hydrochloride, 1-chloro-3-dimethylisorosinduline hydrochloride, or 1-chloro-3-diethyl-11-methylisorosinduline sulphate, or 1-chloro-3-diethyl-13-chloro-isorosinduline nitrate, or the like.

As solvent other mono- or polyhydric alcohols may be substituted for alcohol. So also instead of sodium bisulphite another neutral or acid sulphite, for instance potassium bisulphite, may be used. In synthesizing the chloro-isorosinduline a substituted phenyl-2-naphthylamine may be used.

What I claim is:

1. A process for the manufacture of 1:6-disulphonic acids of alkylated isorosindulines and their derivatives of the constitution

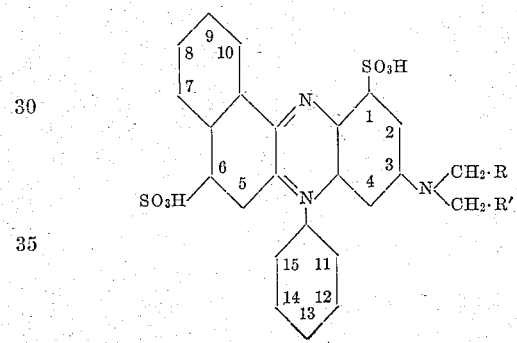

consisting in treating an alkylated 1-chloro-isorosinduline of the constitution

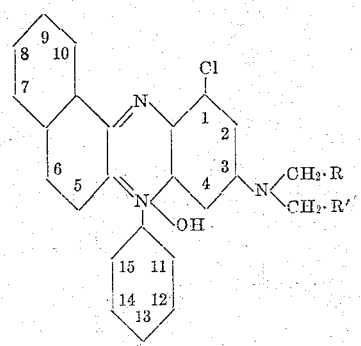

(R and R' being in both cases hydrogen, alkyl or aryl) in an organic solvent with a sulphite and subjecting the product obtained to subsequent oxydation.

2. As new products of manufacture, the dialkylisorosinduline-1:6-disulphonic acids obtained by treatment of an 1-chloro-3-dialkylisorosinduline derivative in an organic solvent with a sulphite solution and subsequent oxydation, the products thus obtained constituting blue dyestuffs dissolving in water to a greenish blue and in concentrated sulphuric acid to a red-brown solution, dyeing wool in an acid bath blue and usable as intermediate products for making naphthosafranine dyestuffs.

In witness whereof I have hereunto signed my name this 5th day of December, 1927.

PAUL LÄUGER.